(12) United States Patent  
Matthies et al.

(10) Patent No.: US 7,253,358 B2  
(45) Date of Patent: Aug. 7, 2007

(54) EARTH DEVICE, PLUG-IN BREAKER AND DISTRIBUTION BOARD

(75) Inventors: Jurgen Matthies, Witten (DE); Mike Breuer, Hamm (DE)

(73) Assignee: CCS Technology Inc., Wilmington, DE (US)

( * ) Notice: Subject to any disclaimer, the term of this patent is extended or adjusted under 35 U.S.C. 154(b) by 21 days.

(21) Appl. No.: 10/476,289

(22) PCT Filed: Apr. 5, 2002

(86) PCT No.: PCT/EP02/03823

§ 371 (c)(1),  
(2), (4) Date: Apr. 15, 2004

(87) PCT Pub. No.: WO02/089262

PCT Pub. Date: Nov. 7, 2002

(65) Prior Publication Data

US 2004/0233593 A1 Nov. 25, 2004

(30) Foreign Application Priority Data

Apr. 27, 2001 (DE) ................................ 101 20 720

(51) Int. Cl.  
*H02G 3/08* (2006.01)

(52) U.S. Cl. ..................... 174/50; 174/51; 174/520; 361/600; 361/634

(58) Field of Classification Search ............ 174/51, 174/50, 48, 480, 481, 17 R, 53, 57, 58, 520, 174/535, 559; 220/241, 242, 3.2, 3.3, 3.8, 220/4.02; 361/460, 627, 633, 634, 636, 640, 361/644, 600, 601, 602, 42

See application file for complete search history.

(56) References Cited

U.S. PATENT DOCUMENTS 3,818,282 A * 6/1974 Buxton et al. .............. 361/627  
4,997,385 A * 3/1991 Casagrande ................. 439/259

FOREIGN PATENT DOCUMENTS

| DE | 9310953 U1 | 10/1994 |
| EP | 0524115 B1 | 9/1995 |
| EP | 1005235 A2 | 5/2000 |
| EP | 1047164 A1 | 10/2000 |

* cited by examiner

*Primary Examiner*—Angel R. Estrada  
(74) *Attorney, Agent, or Firm*—Keith A. Roberson

(57) ABSTRACT

A grounding apparatus for a distribution device having a functional element and a grounding contact point includes a grounding rail having opposed end sections provided with a holding part for fitting the grounding rail to the functional element. An electrically conductive contact spring on each of the end sections extends outwardly beyond the holding part to make contact with the grounding contact point. A safety plug for use with the grounding apparatus includes an overvoltage protection device connected to a conductive contact tongue for contacting an electrical cable connected to the functional element. The overvoltage protection device has a grounding electrode and a conductive fitting in electrical contact with the grounding electrode is provided with an insulation-displacement terminal for connecting the safety plug to the grounding apparatus. A handling apparatus having a base body with a retaining groove is provided for installing the grounding apparatus to the distribution device.

19 Claims, 23 Drawing Sheets

EARTH DEVICE, PLUG-IN BREAKER AND DISTRIBUTION BOARD

CROSS REFERENCE TO RELATED APPLICATIONS

This application is a National application claiming priority to International Application No. PCT/EP02/03823 filed on Apr. 5, 2003, which claims priority to German Patent Application No. 101 20 720.4, filed on Apr. 27, 2001.

FIELD OF THE INVENTION

The invention relates to a grounding apparatus and a grounding device for a distribution device, such a main distributor for a telecommunications system, as well as a safety plug for use with a grounding apparatus according to the invention, and a distribution device. The invention also relates to a handling apparatus for installation of a grounding apparatus on a distribution device.

BACKGROUND OF THE INVENTION

In the case of distribution devices for telecommunications systems, such as a main distributor, overvoltage protection is occasionally required. For this purpose, the cables which are connected to the distribution device are connected to respectively associated overvoltage protection devices via which an associated overvoltage current can be dissipated to ground potential when an overvoltage is applied between the cable conductors that are connected to the distribution device. Since ever more connections have to be arranged in a relatively confined space, for cost and space reasons, it is necessary to provide grounding devices which are matched to the reduced amount of space that is in consequence available.

SUMMARY OF THE INVENTION

The invention provides a grounding apparatus and a grounding device for a distribution device, such as a main distributor for a telecommunications system, as well as a safety plug for use with a grounding apparatus and a grounding device, as well as a distribution device, thus allowing overvoltage protection to be provided simply and flexibly, in a space-saving manner. The invention also provides a handling apparatus for installation of a grounding apparatus on a distribution device, in particular on a functional element of the distribution device, by means of which the grounding apparatus can be fitted securely and easily to the distribution device.

The grounding apparatus according to the invention for a distribution device, for example a main distributor for a telecommunications system, has an elongated grounding rail composed of electrically conductive material, in particular a metal material. The grounding rail is preferably a single thin bent metal sheet, which may be reinforced by beads. The grounding rail is provided on each of its end sections with a separate holding part, that is to say a holding part which is not formed integrally with the grounding rail, via which the grounding rail can be fitted to a functional element of the distribution device. In this case, the expression functional element means a component of the distribution device to which a large number of incoming and outgoing electrical cables are connected, and via which the incoming and outgoing cables can be electrically connected to one another by means of contacts, such as isolating contacts or switching contacts. In this case, incoming electrical cables are those cables which are routed from outside the distribution device, that is to say for example from a switching device, from another distribution device or from subscribers, to the distribution device, and outgoing electrical cables are those cables which are connected to a jumper side of the functional element, and pass onwards from there. The outgoing cables are in this case used as jumper cables, by means of which the desired communications link can be produced by jumpering. The functional element is, for example, in the form of a connecting strip composed of plastic or in the form of a plastic part in the form of a panel, which has a connecting strip for connection of cables, in particular of their cable cores, such as cable wires. Electrically conductive contact springs are provided on the end sections of the grounding rail and are connected to the rail for example via a clamping connection or a welded connection, in particular being formed integrally with it, and extend past the holding part and are intended for making contact with a grounding contact point on the distribution device.

The provision of separate holding parts which are arranged on the longitudinal end sections of the ground rail makes it possible in a simple manner to vary the position of the grounding rail with respect to the holding parts during the production of the grounding apparatus, and thus to match it to the necessary physical characteristics in the distribution device, in particular to the arrangement of the functional elements. It is thus possible in a simple manner, for example, to provide holding parts each having identical receptacles, which are provided at different points, for associated grounding rails. The holding parts may be parts in the form of a block, for example cuboid blocks, in which cutouts are formed for insertion of the associated grounding rail. Two or more identical receptacles may also be provided at different positions on each holding part, so that the holding part is designed as such such that it can be used in a flexible manner.

The respective holding part is preferably in the form of an angled part, in order to save material, one of whose angled limbs is intended to be fitted to the functional element, and whose other angled limb is intended for the fitting of the grounding rail. The angled form in this case still leaves sufficient physical play with respect to the arrangement of the grounding rail relative to the functional element since the choice of the length and alignment of the angled limbs for the grounding rail allows a sufficiently large number of positions relative to the functional element.

In order to more safely prevent cable currents from inadvertently breaking through to the grounding rail the holding parts are preferably produced from a nonconductive material, in particular from nonconductive plastic. Plastic parts such as these can be provided in a simple and cost-effective manner as injection-molded parts. Since the functional elements are themselves preferably composed of nonconductive plastic material, plastic material is thus also advantageous for the holding parts, since this reduces the risk of damage to the functional elements when the holding part is attached.

According to one embodiment of the invention, the holding parts each have a holding piece for fitting to the associated functional element, which holding piece extends essentially in a direction at right angles to the longitudinal direction of the grounding rail. Furthermore, the contact springs run essentially in the same direction as the holding pieces, that is to say they extend essentially parallel to the holding pieces away from the grounding rail. This results in a compact design, which has an advantageous effect on the space required for the entire distribution device. Each holding piece may, for example, be formed by one limb of the angled holding part, for example in the form of an extension piece (in the form of a pin) on one angled limb, which can engage in a cutout that is formed on the functional element. A cutout can also be provided as a holding piece at the end on the free end of the angled limb, and a corresponding projection on the functional element can engage in this cutout. If a holding part which is in the form of a cuboid block is used, the holding piece may, for example, be a projection in the form of a pin, which can engage in a corresponding cutout in the functional element, or may be a cutout whose opening points in said direction and in which an engagement piece which is provided on the functional element can engage.

The grounding rail is advantageously arranged offset with respect to the holding pieces in a direction at right angles to its longitudinal direction and at right angles to the direction in which the holding pieces extend. In consequence, the grounding rail of a grounding apparatus which is fitted to the functional element is also arranged correspondingly offset with respect to the functional element, so that an operator still has sufficient access to the functional element in order to make it possible to carry out jumpering work on the functional element without being impeded by the grounding apparatus. The contact springs preferably extend parallel the holding pieces, running past the associated holding parts; the contact springs are thus for this purpose start from the grounding rail and extend away in the direction of the holding pieces that are arranged offset. In the case of a grounding rail which is formed integrally with the contact springs, the contact springs are for this purpose simply bent at an angle in the corresponding direction.

The contact springs may, for example, extend internally, that is to say they may extend past the mutually facing sides of the holding parts, in which case corresponding retaining openings may then need to be provided in the functional elements, through which the contact springs are passed to the grounding contact point. The contact springs advantageously extend past the holding parts on the outside, at the sides with respect to the longitudinal direction of the grounding rail, and can be spread apart in a sprung manner outwards at the sides. They can thus make contact in a sprung manner with a grounding contact point from the outside at the sides. From the design point of view, this makes it easier to provide an associated grounding contact point. Furthermore, there is no need to provide cutouts for the contact springs on the functional element, so that the functional element can be designed more effectively for accommodation of cable connections. The single-point spring contact, which is also preferably achieved by the contact spring, with the grounding contact point results in only minor cable losses and can likewise be designed in a simple manner.

Each contact spring is preferably provided at its free end with an engagement part, for example in the form of an engagement projection or a cutout, which can be engaged in a sprung manner with a corresponding engagement part on the functional element. In consequence, the contact spring is also at the same time used as a fixing element, which preferably fixes the grounding apparatus on the functional element by interaction with the respective holding part. Since the contact spring in this case runs past the holding part, immediately adjacent to it, this results in direct and thus short force profiles, so that it is possible to provide components that are used having less strength, so that the components are thus lighter and their costs are less.

The safety plug according to the invention for use with a grounding apparatus according to the invention has a contact tongue via which electrical cables which are laid in an associated functional element and are connected to it can be made contact with. For example, in case of a functional element to which two or more incoming double core cables can be connected, the safety plug according to the invention is designed, for example, with a double contact tongue, on which two separate conductor tracks are formed, with which the respective conductors in a double core cable make contact when the safety plug is inserted into the functional element. According to the invention, the contact tongue is connected to an overvoltage/overcurrent protection device. With regard to said example with double core cables, the overvoltage/overcurrent protection device then, by way of example, has two electrodes which make contact with the respective conductor track, and thus with the associated cable core in the double core cable. According to the invention, the overvoltage/overcurrent protection device has a grounding electrode which has an attachment in the form of a rod, and via which an associated overvoltage current can be dissipated when an overvoltage is applied, for example between the two cores of a double core cable. The safety plug according to the invention, also has an electrically conductive fitting, by means of which the safety plug can be fitted to the grounding rail of the grounding device, and which makes electrical contact with the grounding electrode. This has the advantage that the fitting is used as both a mechanical connection and an electrical connection between the safety plug and the grounding apparatus. According to the invention, in order to produce this mechanical and electrical contact, the fitting has: an insulation-displacement terminal, by means of which the fitting is clamped to the attachment, which is in the form of a rod, on the grounding electrode, and an attachment part for attaching the fitting to the grounding rail.

The insulation-displacement terminal represents a secure and simple mechanical and electrical connection between the safety plug and the grounding apparatus. In contrast to a soldered joint, there is no risk of an insulation-displacement terminal becoming unsoldered if the connection point were to become hot in the event of high overvoltage currents. Furthermore, an insulation-displacement terminal does not result in any forces being exerted on the safety plug, which would have to be absorbed by other external bearings, either. The remaining safety plug components are thus preferably held on the fitting exclusively via the insulation-displacement terminal connection, and the fitting accordingly also preferably holds the safety plug on the grounding apparatus on its own.

The attachment part is preferably likewise in the form of a clamping part which can be clamped to the grounding apparatus, that is to say to its grounding rail. This clamping part may likewise be an insulation-displacement terminal, with the grounding rail for this purpose being provided, for example, with corresponding pins, onto which this insulation-displacement terminal can be clamped. The clamping part is preferably provided with two such clamping limbs which can spring apart elastically and between which the grounding rail can be clamped in places, in the direction transversely with respect to its longitudinal direction. This clamping connection can be produced particularly easily and thus at low cost, while its holding function is nevertheless sufficiently secure.

The grounding device according to the invention has a grounding apparatus according to the invention and at least one safety plug according to the invention, which is fitted to the grounding rail of the grounding apparatus. The safety plugs are preferably fitted to the grounding rail such that they can be replaced or interchanged, in particular by means of a clamping apparatus, as described above, as an attachment part for the fitting, by means of which safety plugs can be fitted to and detached from the grounding apparatus particularly quickly.

The distribution device according to the invention has an elongated retaining apparatus, one or more functional element or elements which are held in the retaining apparatus, with the retaining apparatus being designed such that the functional elements are stacked one on top of the other at a distance from one another, in particular being stacked located one above the other or horizontally, and can be held therein. Each functional element has an elongated contact section, that is to say for example a contact strip, with connecting points for connection of incoming and outgoing electrical cables. The distribution device also has at least one grounding apparatus according to the invention, whose grounding rail is arranged parallel to the elongated contact section of the associated functional element, and which is fitted by means of the associated holding parts to longitudinal end sections of the functional element; the longitudinal element sections are in this case related to the longitudinal direction of the contact section. The distribution device also has at least one safety plug according to the invention, which is fitted to the grounding rail such that its contact tongue extends in the direction of the functional element, in order to make contact with the electrical cables associated with it.

The grounding process is completed by the contact springs of the respective grounding apparatus being electrically connected to the respectively associated grounding contact points, which are connected to ground. For this purpose, the entire retaining apparatus is preferably simply composed of conductive material, in particular of metal, with the contact springs on the grounding rail of the grounding apparatus making electrical contact with a section of the retaining apparatus that is used as the grounding contact point, in order in this way to complete the grounding process. The retaining apparatus may, however, also be equipped with a separate grounding cable, which is electrically connected via respectively associated grounding contact points to the contact springs on the grounding rail of the respective grounding apparatus.

According to one embodiment of the invention, the grounding rail of the respective grounding apparatus is arranged offset with respect to the associated functional element in the direction along the retaining apparatus. In consequence, the access points to the connecting points of the respective functional element remain sufficiently accessible for an operator.

According to a further embodiment of the invention, the connecting points are arranged along the elongated contact section of the respective functional element, and are subdivided into a row of first connecting points for incoming cables, and a row of second connecting points for outgoing cables. The grounding rail of the associated grounding apparatus is in this case arranged adjacent to the row of second connecting points, on its side facing away from the row of first connecting points. In this arrangement, the space that is provided between the rows of first and second connecting points for jumpering is not blocked by the grounding apparatus, and is thus conveniently accessible for an operator. Since the functional elements are arranged one above the other or alongside one another in the retaining apparatus, this offsetting of the grounding rail is, however, chosen only to such an extent that the grounding rail always still covers the row of first connecting points of the functional element arranged underneath it or alongside it, but not the free space which follows once again underneath it or alongside it, in particular not the subsequent row of second connecting points of this functional element. This is because this free space is intended to be accessible for the insertion of safety plugs, and the respective rows of second connecting points (jumper side) must be accessible for jumpering.

According to one embodiment of the invention, the retaining apparatus is designed in the form of an elongated, electrically conductive retaining trough with a trough base and two trough limbs. The retaining trough is preferably composed of metal material. Elongated retaining tongues are formed in the trough limbs, and their longitudinal directions extend parallel to the direction in which the limbs extend, and hence at right angles to the longitudinal direction of the trough. Each functional element is inserted between the retaining tongues, that is to say between each two retaining tongues, with the contact springs of the grounding apparatus which is fitted to the respective functional element making contact in a sprung manner with the retaining tongues in order to produce an electrical contact.

The contact springs produce a secure single-point grounding contact, which has a low cable loss. The grounding apparatus is essentially held on the functional element by the two holding parts, with the contact spring in this case, but advantageously, carrying out a fixing function, which is possible while retaining a single-point contact.

In order to achieve an improved fixing effect by means of the contact springs, these are preferably each provided at their free end section with an engagement part, which engages with a corresponding mating piece which is provided on the respective associated functional element, in order to fix the grounding apparatus on the functional element. The respective engagement part may, for example, be provided simply in the form of a projection which is formed by the contact spring and can engage in a cutout formed in the functional element, or may be a cutout in which a projection that is formed on the functional element can engage.

In a situation where the holding parts of the respective grounding apparatus are provided with a holding piece, for example a holding pin, which points in the direction of the functional element (insertion direction) and engages in a corresponding opening in the functional element, and the contact springs extend parallel to this holding piece and their engagement part engages with a corresponding mating piece, the grounding apparatus is then fixed by the holding piece/mating piece connection in a direction transversely with respect to the holding piece direction. The engaged contact springs in this case prevent the holding piece from moving out of the mating piece, which is formed in the functional element, seen in its longitudinal direction or insertion direction. This means that the contact springs fix the grounding apparatus in its insertion direction. The contact springs preferably extend past the respective holding parts and their holding piece, closely adjacent to them, thus achieving particularly compact retention.

The handling apparatus according to the invention for installation of a grounding apparatus according to the invention has an elongated base body which is in the form of a box and in which a groove which runs in its longitudinal direction is provided, which is open on the outside and into which a grounding rail of the grounding apparatus can be inserted with little play. Each longitudinal end section of the base body has a side stop, by which a grounding apparatus (whose grounding rail is inserted into the groove) can be gripped on the longitudinal sides with little play, and thus can be centered with respect to handling apparatus. The groove is advantageously essentially of precisely the same length as the grounding rail which is to be accommodated in it.

The handling apparatus according to the invention allows a grounding apparatus to be gripped easily and securely, and can thus be fitted more quickly to a functional element of the distribution device.

In order to make it even easier to fit the grounding apparatus, the base body advantageously has at least one guide tongue, which extends transversely with respect to the longitudinal direction of the groove and forwards in the direction of the groove opening, and which has a straight side surface for sliding along a corresponding guide surface on a functional element. An operator therefore just has to place the straight side surface of the guide tongue on the corresponding guide surface, with the handling apparatus sliding along the guide surface together with the side surface of the grounding apparatus inserted into it, in order to fit and to install the grounding apparatus exactly on a functional element. This largely avoids tilting and other installation faults which could lead to damage to the parts.

Two guide tongues are preferably provided which are arranged at a distance from one another with respect to the longitudinal direction of the base body, and whose straight side surface is formed by their side end surface. The two straight side surfaces advantageously either face one another or, in particular, face away from one another, so that the guide tongues which are placed on the corresponding guide surfaces are guided such that they are fixed at the sides, and can thus no longer slide out of their desired guide path at the sides.

The guide tongues are in this case preferably also placed at the top and bottom against corresponding guide surfaces, so that no inadvertent displacement is possible in these directions either.

When the grounding apparatus is inserted into the handling apparatus, the guide tongues preferably extend adjacent and parallel to the contact springs, and preferably at the same time also adjacent and parallel to the holding parts, in particular to their holding pieces, so that these parts, which are to be attached and with which contact is to be made, on the grounding apparatus are arranged close to the guide tongues that are used as guide elements, in order for these parts in particular to keep the discrepancies from the desired movement path, caused by play, as small as possible.

According to one embodiment of the invention, the base body has an upper and a lower boundary wall as well as two end walls and a boundary wall on the longitudinal side, and is open on one longitudinal side. The groove is in this case open in essentially the same direction as the open longitudinal side of the base body. This configuration has the advantage that the parts of the guide apparatus can be partially accommodated in the base body, which is in the form of a box, without any problems if required, since the grounding apparatus is inserted into the groove precisely on that side of the handling apparatus on which the base body is also open. Furthermore, cutouts can also be provided in the upper boundary wall and in the lower boundary wall of the base body, in which components of the grounding apparatus are held, depending on the shape of the grounding apparatus to be accommodated, if they are inserted into the handling apparatus.

The side stops are preferably formed by the two end walls of the base body, thus avoiding additional stop pieces.

The respective guide tongue is preferably formed from the upper boundary wall of the base body, and the groove is advantageously formed in the lower boundary wall of the base body.

This avoids additional components, so that the handling apparatus has a very compact, and thus low-cost, form. The arrangement (offset with respect to the height direction of the base body) of the guide tongues from the retaining groove is particularly preferable for a corresponding offset of the grounding rail and of the holding pieces of the grounding apparatus.

BRIEF DESCRIPTION OF THE DRAWINGS

The invention will be explained in the following text using preferred embodiments and with reference to the drawings, in which.

DETAILED DESCRIPTION OF THE INVENTION

Figure 4:
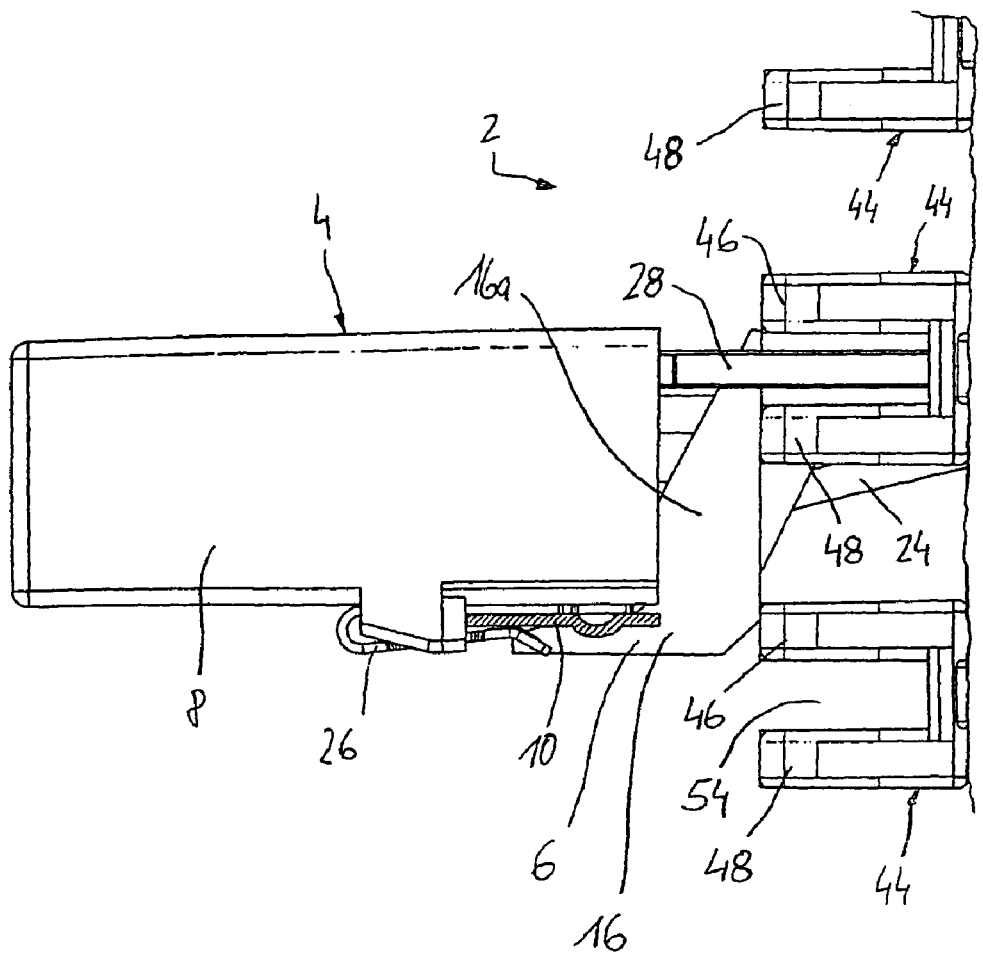
FIG. 4 shows a section view along the distribution device illustrated in FIG. 3, illustrated enlarged.
Figure 5:
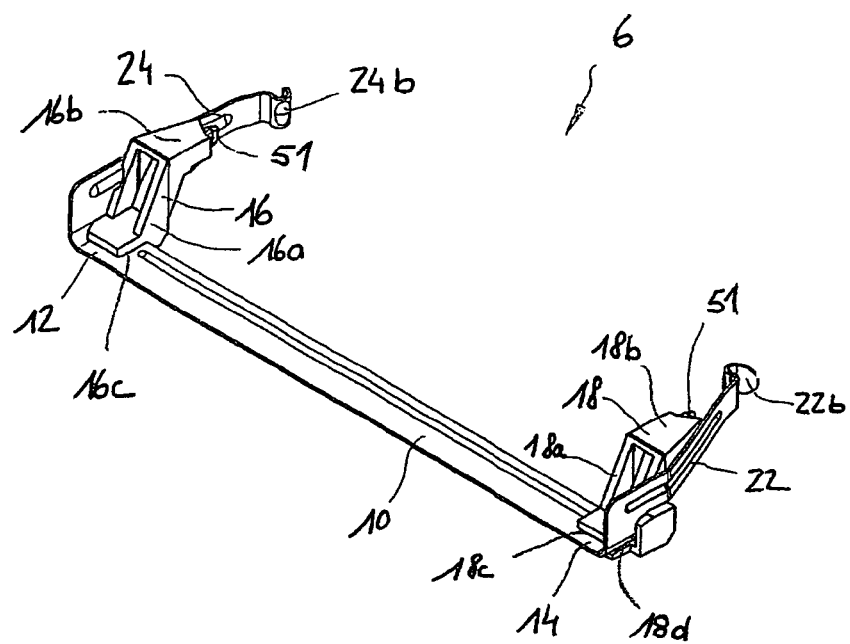
FIGS. 5 and 6 show the grounding apparatus according to the invention in a perspective view from the side and from above, and from the side and from below, respectively.
Figure 6:
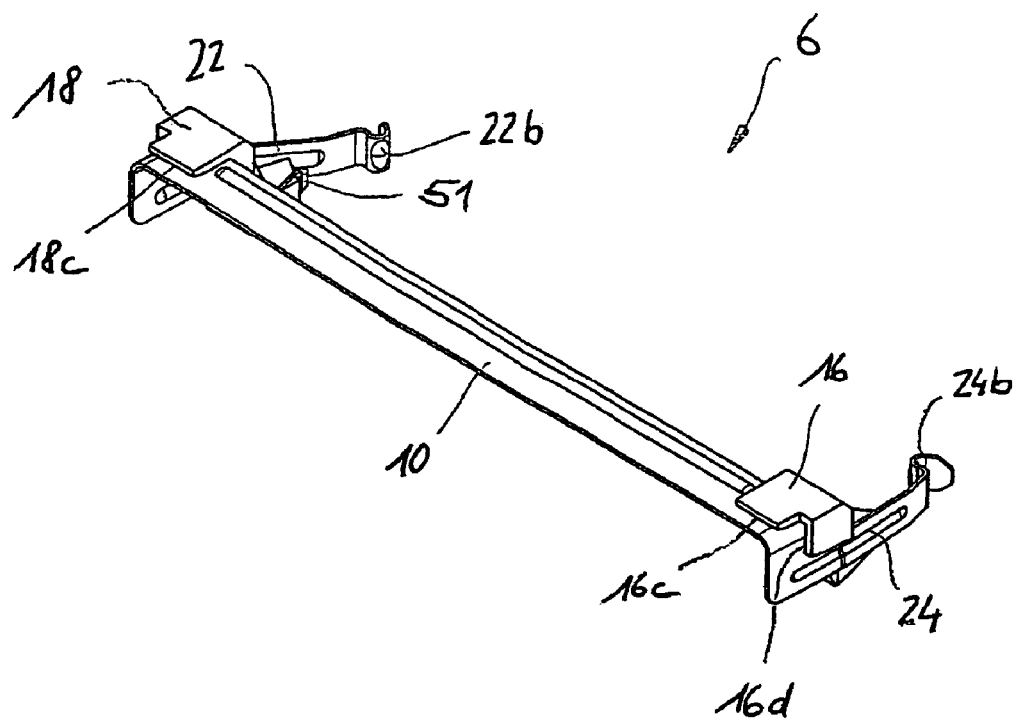

FIGS. 1 to 4 show sections of a distribution device 2 according to the invention. The distribution device 2 has a grounding device 4 according to the invention with a grounding apparatus 6 and a safety plug 8 according to one embodiment of the invention. FIGS. 5 and 6 show the grounding device 6 separately, in each case in a perspective view.

This embodiment of the grounding apparatus 6 has an elongated, flat grounding rail 10, which in this case is provided as a metal rail composed of a single bent metal sheet. On its two longitudinal end sections 12, 14, the grounding apparatus 6 has a respective holding part 16, 18, which is in this case provided as an angled plastic part, which has a first limb 16a, 18a and a second limb 16b, 18b (see, for example, FIG. 1).

A retaining slot 16c, 18c, into which the grounding rail 10 is inserted, is formed at the free end of one limb 16a, 18a of the respective holding part 16, 18. One limb 16a, 18a of the respective holding part 16, 18 starts from the grounding rail 10 and extends essentially at right angles to its longitudinal direction upwards, and the other limb 16b, 18b of the respective holding part 16, 18 extends essentially at right angles to the longitudinal direction of the grounding rail 10 forwards, in the direction of a functional element 20 which is associated with the grounding apparatus 6 and is arranged in the distribution device 2, together with other functional elements 20, which are designed in a corresponding manner, as will be explained in more detail later.

The grounding rail 10 is provided as an elongated, flat plate, which is provided with elongated beads for reinforcement. The grounding rail 10 is provided on its longitudinal end sections 12, 14 with elongated contact springs 22, 24, which are in the form of tongues and are in this case formed integrally with the grounding rail 10, to be precise by the longitudinal end sections 12, 14 of the grounding rail 10 first of all being bent upwards, and then extending forwards with a narrow strip, forming the respective contact spring 22, 24. Each respective contact spring 22, 24 thus has an angled profile (see in particular FIG. 3) which follows the angled profile of the respective holding part 16, 18, with the contact springs 22, 24 in the end extending forwards essentially parallel to the associated other limb 16b, 18b of the respective holding part 16, 18.

Figure 1:
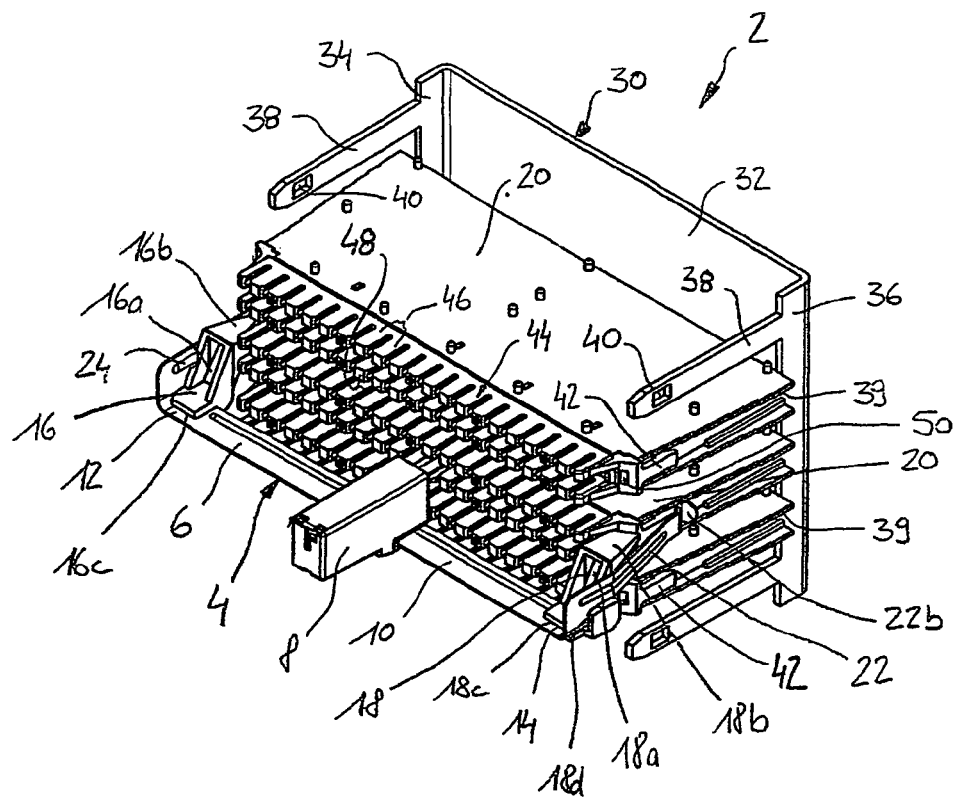
FIG. 1 shows a distribution device with a grounding device according to one embodiment of the invention, illustrated in perspective, from the side and from above.
Figure 2:
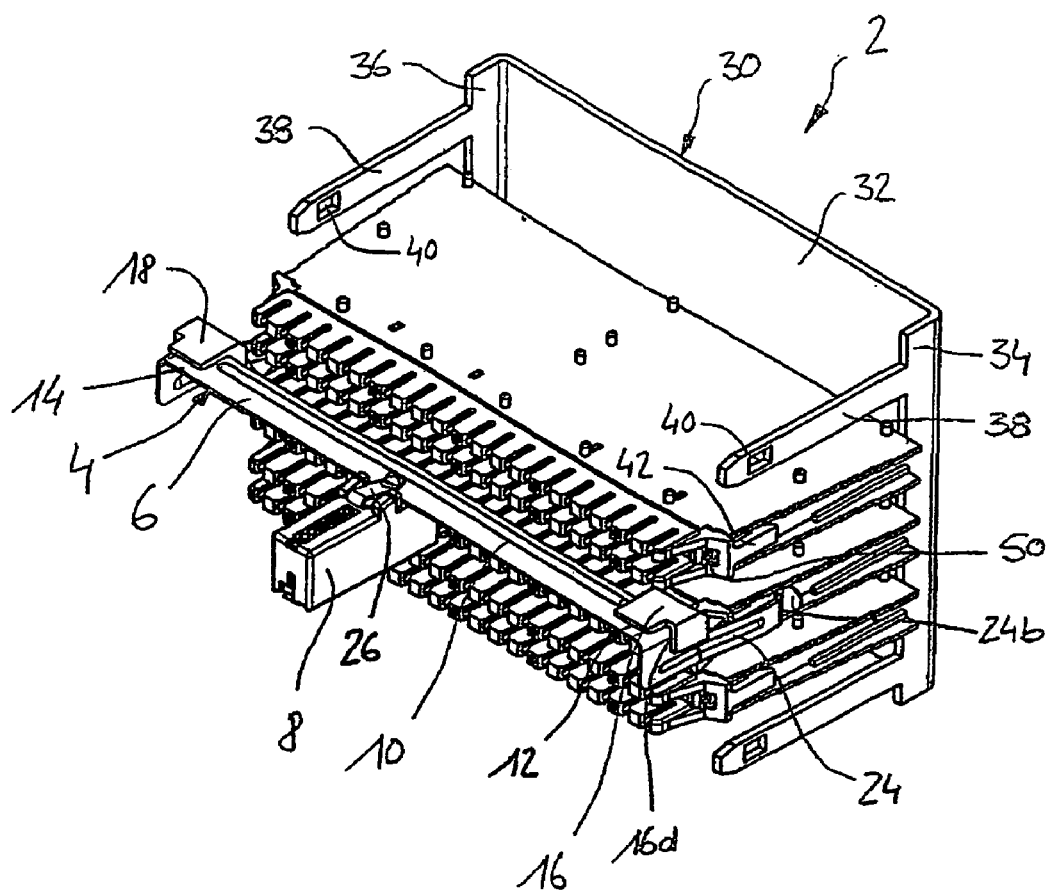
FIG. 2 shows the distribution device illustrated in FIG. 1, in a perspective view from the side and from below.
Figure 3:
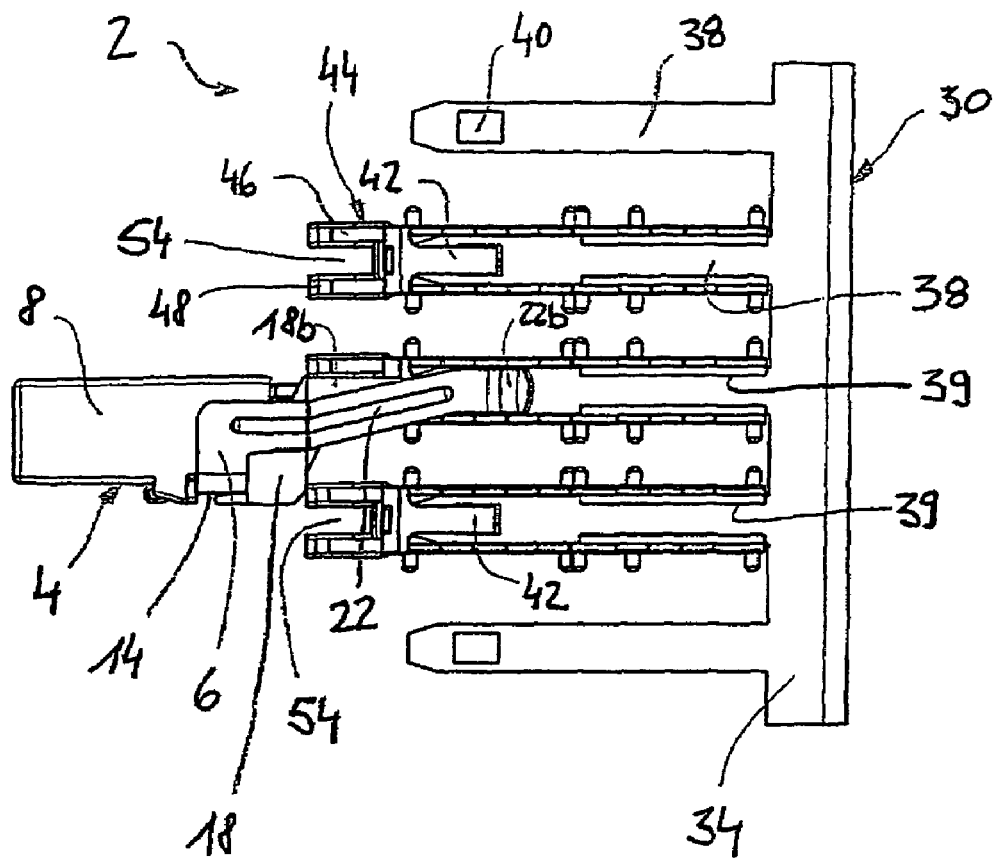
FIG. 3 shows the distribution device according to the invention from the side.

The contact springs 22, 24 each pass the associated holding part 16, 18 on the outside at the sides, with the respective holding part 16, 18 having a retaining slot 16d, 18d on the outside at the sides, in which the foot of the respective contact spring 22, 24 is held (see, for example, FIGS. 1 and 2). According to this embodiment, the contact springs 22, 24 are also each provided with a reinforcing bead. The two contact springs 22, 24 are also each bent towards one another, that is to say inwards (see, for example, FIG. 1) and can be spread apart resiliently upwards.

As will be explained later in detail, a safety plug 8 is plugged onto the grounding rail 10. If required, additional safety plugs 8 can also be plugged onto the grounding rail 10 alongside the safety plug 8 that is shown, to be precise up to a maximum of ten safety plugs 8 in this embodiment. In order to plug each of the safety plugs 8 onto the grounding rail 10, the safety plugs have a fitting 26, as can be seen in FIG. 4, which is in the form of a bracket and is used as a holding apparatus, and by means of which the safety plug 8 is clamped onto the grounding rail 10.

The safety plug 8 also has a contact tongue 28 which extends forwards (see, for example, FIG. 4) and which, as will be explained in more detail later, can make contact with electrical cables which are provided in the distribution device 2. The fitting 26, which is in the form of a bracket, is composed of metal material and is thus electrically conductive, so that it dissipates an associated overvoltage current to the grounding rail 10 in the event of an overvoltage between the cable conductors with which the contact tongue 28 makes contact.

The distribution device 2 also has a retaining apparatus 30, which is in the form of a trough with a trough base 32 and two trough limbs 34, 36, which extend at right angles in the same direction starting from the trough base 32. Elongated retaining tongues 38 are formed in the trough limbs 34, 36, extend in the direction in which the trough limbs 34, 36 extend, and are arranged in pairs opposite one another. A cutout 40, in which an engagement part of a functional element 20 can engage, is formed on the free end section of each retaining tongue 38.

The functional elements 20 are in this case parts in the form of plates which are produced, in particular, from nonconductive material, in particular from plastic material. The functional elements 20 in the form of plates are elongated, with the length of the functional elements 20 corresponding approximately to the width of the retaining apparatus 30. On their end faces, the functional elements 20 are provided with longitudinal grooves 39, such that they can be inserted, on the two longitudinal end sections, between two retaining tongues 38 of the retaining apparatus 30, such that the retaining tongues 38 can engage in the end longitudinal grooves in the functional element 20.

At their end of the respective longitudinal groove 39 facing away with respect to their insertion direction of the retaining apparatus 30, the functional elements 20 also have an engagement projection, which, when the functional element 20 is completely inserted between two retaining tongues 38, engages in the cutout 40, which is formed at the free end of each retaining tongue 38, in order to fix the functional element 20. The engagement projection is fitted to a resilient engagement arm 42, which can be bent outwards and is bent outwards in order to remove the functional element 20, in order to remove the engagement projection from the cutout 40.

A number of functional elements 20 can thus be held stacked one on top of the other in the retaining apparatus 30, corresponding to the number of retaining tongues 38 which are arranged opposite one another in pairs.

On its longitudinal side facing away from the trough base 30, each functional element 20 has an elongated contact section 44 in the form of a contact strip with two or more first connecting points 46 for incoming cables, and with two or more second connecting points 48 for outgoing cables. The first connecting points 46, which are intended for the incoming cables, extend in the longitudinal direction of the contact section 44 on the upper face of the functional element 20 in a row, and the connecting points 48 for the outgoing cables extend parallel to the first connecting points 46, likewise along the contact section 44, in a row. With regard to the functional elements 20 which are arranged one above the other, the row of first connecting points 46 for each functional element 20 is arranged above the row of second connecting points 48.

According to this embodiment, ten first connecting points 46 and ten second connecting points 48 are provided in each case, with each connecting point 46, 48 having a double contact point for connection of in each case two cable wires or cores of a double core cable. A total of twenty connecting contact points are thus provided for the incoming double core cables and twenty connecting contact points are provided for the outgoing double core cables, per functional element 20. The cables which are not shown are introduced at the side into the respective functional element 20, where their cable cores are routed along the core guides and are electrically connected to the individual connecting contact points of the connecting points 46, 48.

A retaining cutout 50 (see, for example, FIGS. 1 and 2) is formed on each longitudinal end section of the elongated contact section 44 of each functional element 20, and a holding piece 51 in the form of an engagement pin (see, for example, FIGS. 5 and 6 and FIGS. 15 and 16 as well) engages in this cutout 50. The holding piece 51 is formed on the respective other limb 16b, 18b of the respective holding part 16, 18 (see, for example, FIGS. 5 and 6). The grounding apparatus 6 is held and fixed via this pin connection in a direction along the retaining apparatus 30 and transversely with respect to the grounding rail 10.

Each of the contact springs 22, 24 is provided at its respective free end 22b, 24b with a projection which points inwards and which, when the grounding apparatus 6 is inserted together with the holding piece 51 of the respective holding part 16, 18 into the associated retaining cutout 50 in the associated functional element 20, engages behind the engagement arm 42, which projects slightly outwards at the sides, of the associated functional element 20. In consequence, the grounding apparatus 6 is also fixed such that it is secured in a direction axially parallel to its insertion direction to the respective other angled limb 16b, 18b and the contact springs 22, 24, and likewise parallel to the retaining tongues 38. At the same time, in this case, the projection on the contact springs 22, 24 makes contact in a sprung manner with the respectively associated retaining tongue 38 on the electrically conductive retaining apparatus 30 of the distribution device, so that the grounding rail 10 is at ground potential.

Each safety plug 8 has a respective associated first connecting point 46 and an associated second connecting point 48, which is arranged opposite a respective first connecting point 46. The contact tongue 28 of each safety plug 8 in this case extends between the two rows of connecting points 46, 48 (see, for example FIG. 4) in order, as will be explained further below in detail, for each first connecting point 46 to make contact with the two associated cable cores of an electrical cable which is connected to them, and for each associated second connecting point 48 to make contact with the two associated cable cores of an electrical cable which is connected to them.

Since, as can be seen in particular from FIG. 4, the grounding rail 10 is arranged offset downwards in the longitudinal direction of the retaining apparatus 30 with respect to the respectively associated functional element 20, the space 54 between the upper connecting points 46 and the lower connecting points 48 in each functional element 20 and, in particular, the respective row of lower connecting points 48 (jumpering side) is accessible without any problems for an operator, for jumpering of cable wires/cable cores.

According to this embodiment, the grounding rail 10 is arranged offset well downwards with respect to the respectively associated functional element 20, such that the grounding rail 10 is arranged approximately precisely at the same level as the upper connecting parts 46 of the next subsequent lower functional element 20 (see, for example, FIG. 4), in order likewise not to block its space 54 between its upper connecting points 46 and lower connecting points 48 and, in particular, its lower connecting points 48 (jumpering side). The downwards offset of the grounding rail 10 is likewise chosen to be of such a magnitude that an associated safety plug 8 can be accommodated without any problems in the free space which is created above the respective grounding rail 10 by the offset.

As is shown in FIGS. 7 to 10, a safety plug 8 according to the invention has a flat, elongated contact tongue 28, which is provided at its free end 76 with a longitudinally central gap 78, and on both sides of which two separate conductor tracks 80, 81, 82, 83 are in each case formed and each make contact with an associated cable core of a double core cable which is connected to a first connecting point 46 and of an associated [sic] to a second connecting point 48 of the distribution device 2, when the safety plug 8 is connected via its associated grounding device 4 to a distribution device 2.

Figure 8:
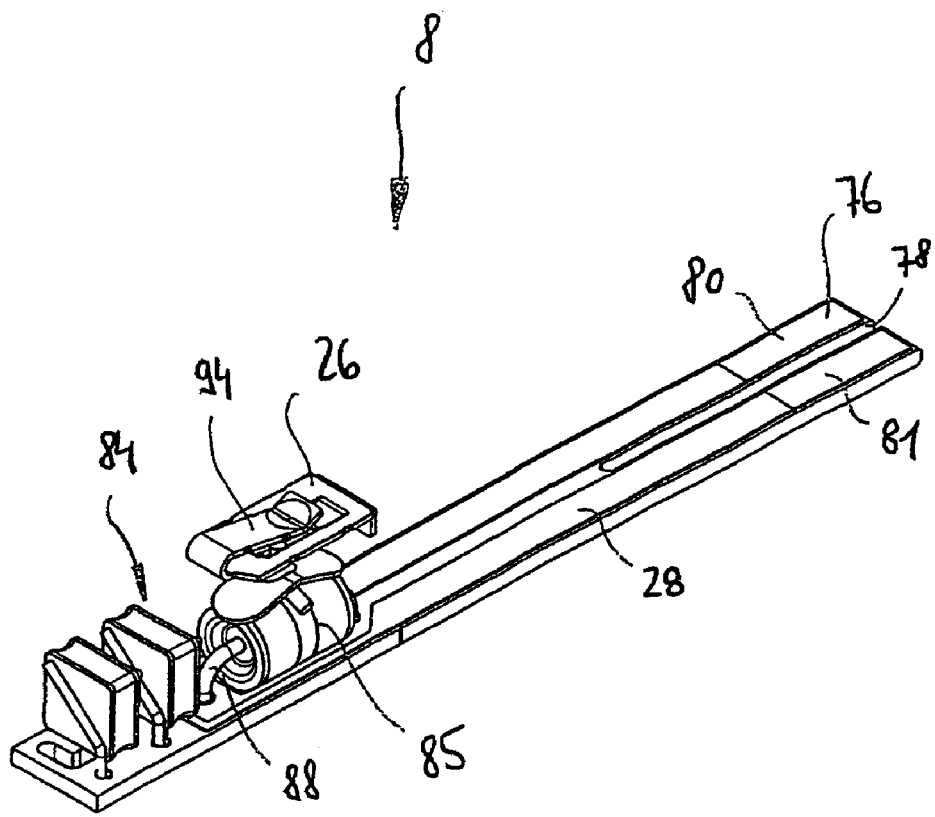
FIG. 8 shows the safety plug illustrated in FIG. 7, with the protective cover removed.
Figure 9:
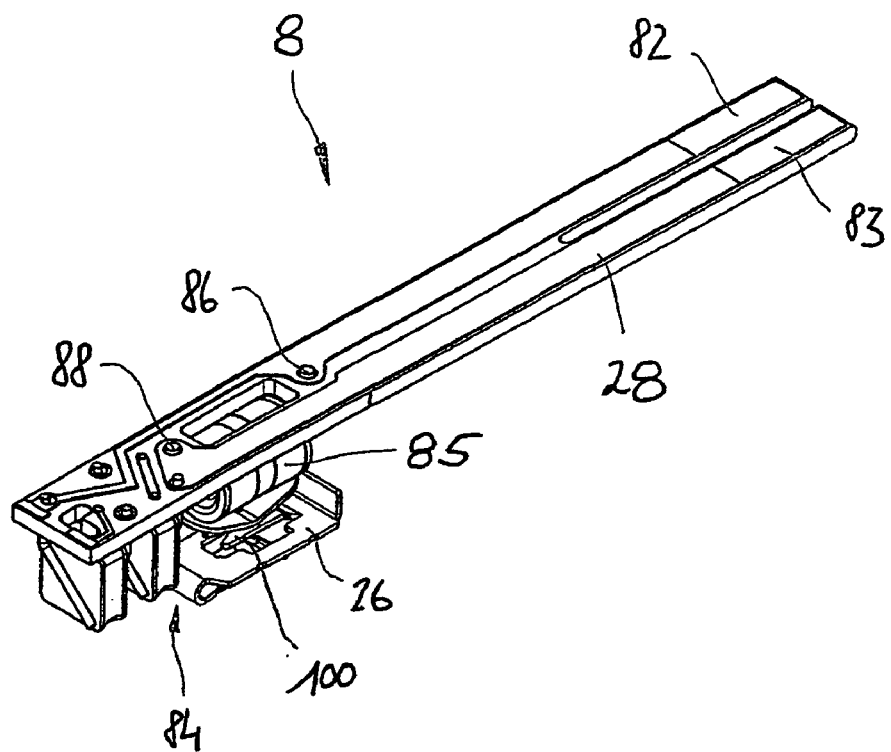
FIG. 9 shows the safety plug illustrated in FIG. 8, viewed in a direction from the side and from above.
Figure 10:
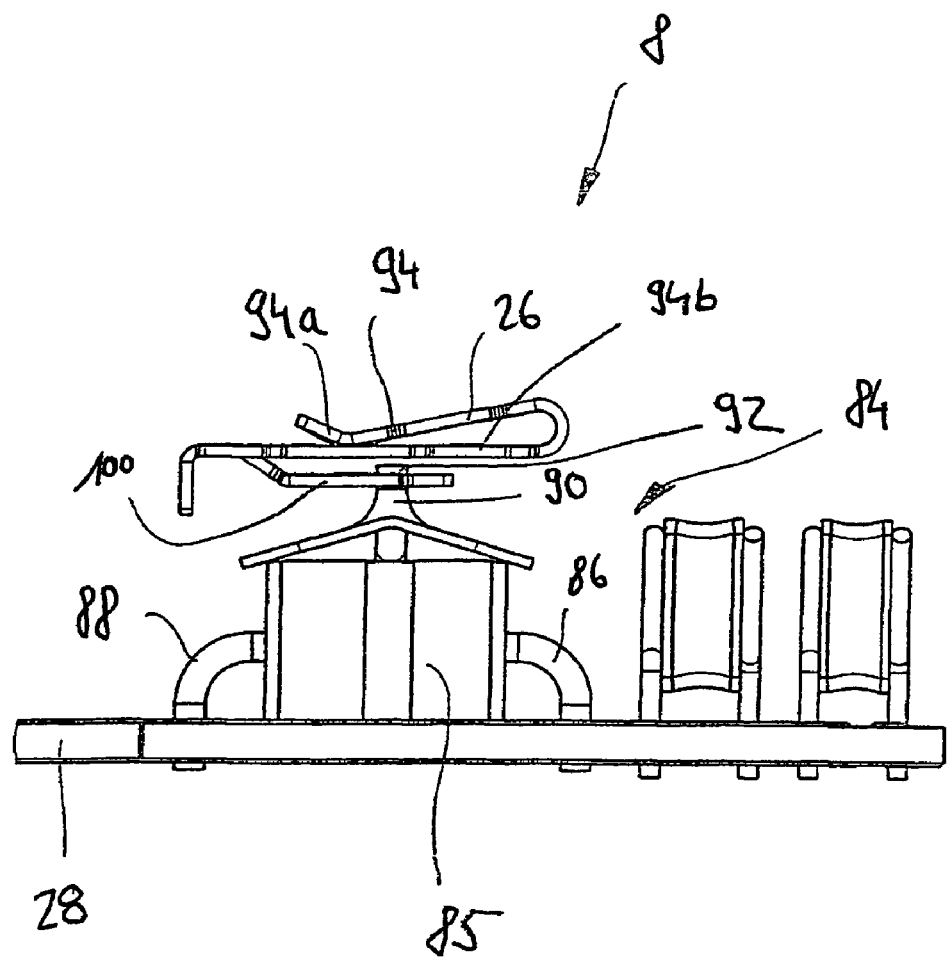
FIG. 10 shows an enlarged section of the safety plug illustrated in FIG. 8, in a side view.

As can be seen in particular from FIGS. 8 to 10, an overvoltage/overcurrent protection device 84 is arranged at the other end of the contact tongue 28 and has a surge arrester 85 with a first electrode 86, a second electrode 88 and a third electrode 90. The first electrode 86 and the second electrode 88 are each connected electrically directly to those respective conductor tracks 82, 83 which are intended to make contact with the respective cable cores of that cable which is connected to a first connecting point 46 (incoming cable). The two remaining conductor tracks 80, 81 on the other side of the contact tongue 28, which are intended to make contact with the respective cable cores of that cable which is connected to the associated second connecting point 48 (outgoing cable), are connected via the overvoltage/overcurrent protection device 84 to the conductor tracks 82, 83. During normal operation, the third electrode 90 does not make electrical contact with the first electrode 86 or the second electrode 88. In the situation where there is an overvoltage between the two cable cores of the incoming cable which are connected to the respective conductor track 82, 83, an electrical contact is formed via the surge arrester 85 between the three electrodes 86, 88, 90 such that an associated overvoltage current is dissipated to the third electrode 90. The overvoltage current is then passed on via the third electrode 90 to the grounding rail 10, so that the third electrode 90 acts as a grounding electrode.

Figure 11:
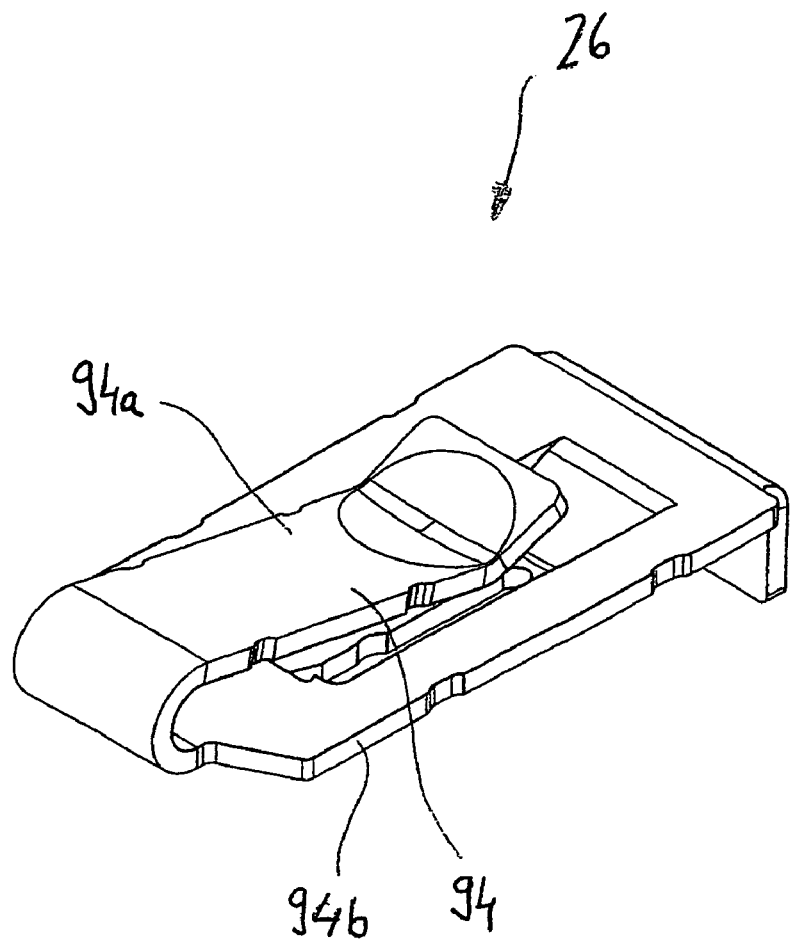
FIG. 11 shows a fitting for the safety plug according to the invention, illustrated in perspective from the side and from below.
Figure 12:
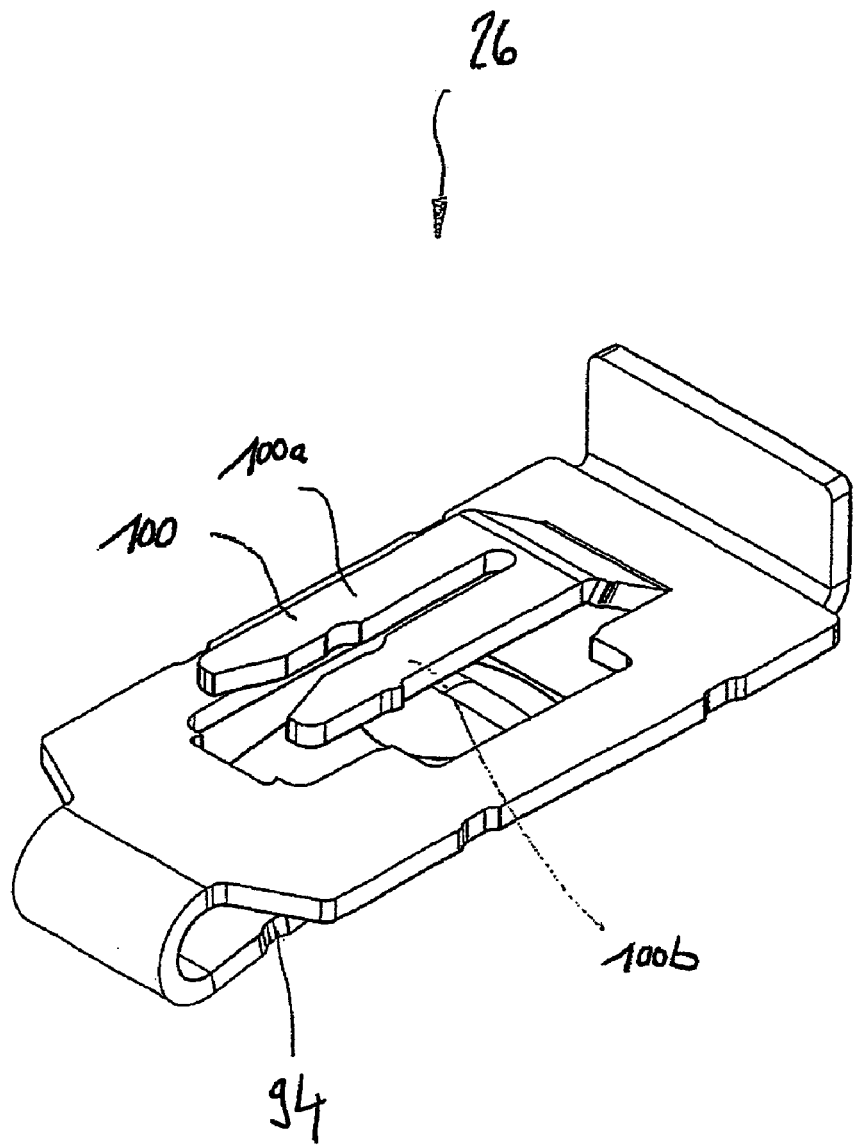
FIG. 12 shows the fitting shown in FIG. 11, illustrated in perspective from the side and from above.
Figure 13:
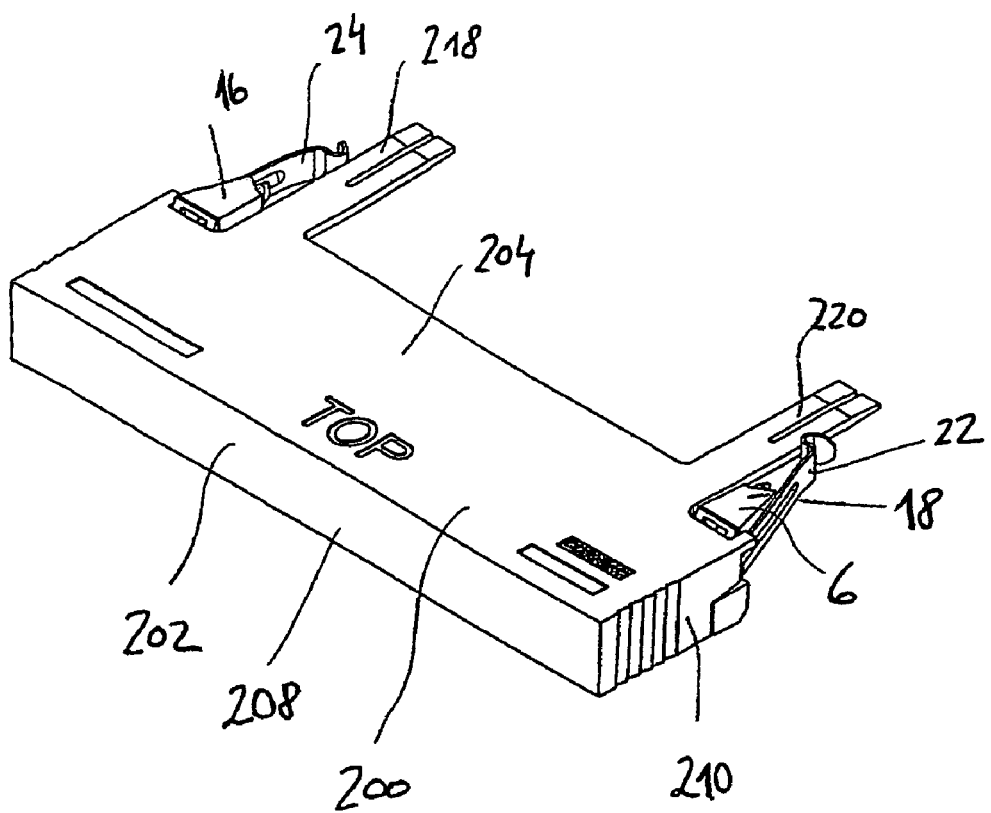
FIGS. 13 to 16 show a handling apparatus according to one embodiment of the invention, with a grounding apparatus inserted in it, in different perspective views.
Figure 14:
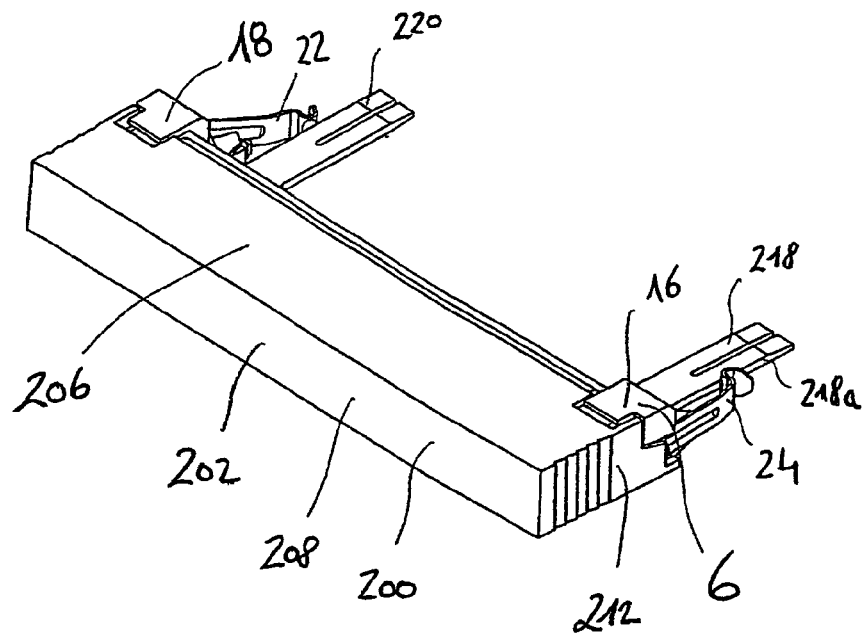
Figure 15:
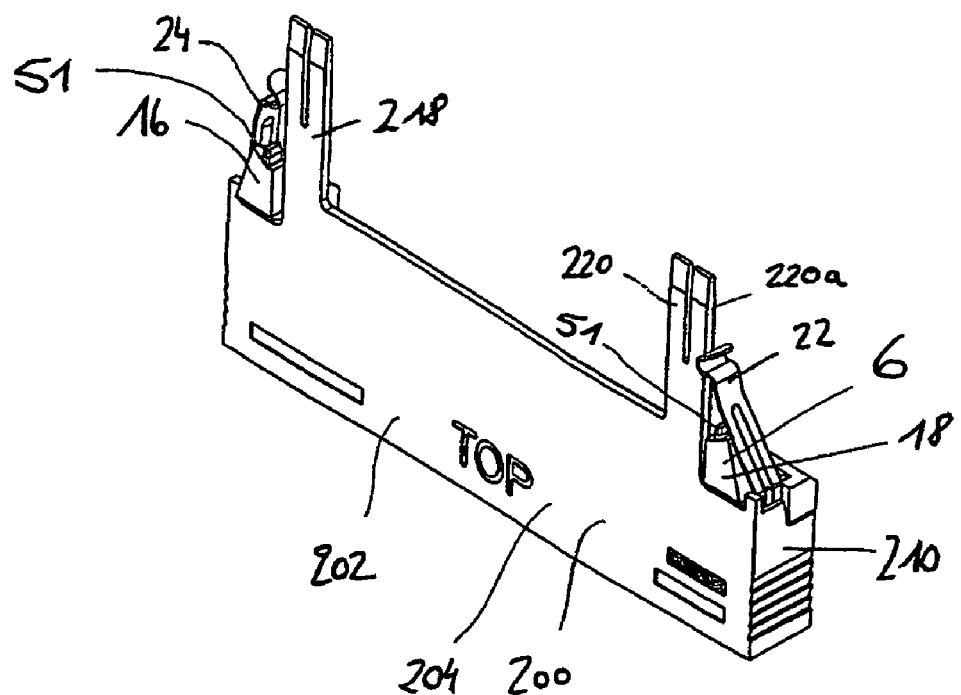
Figure 16:
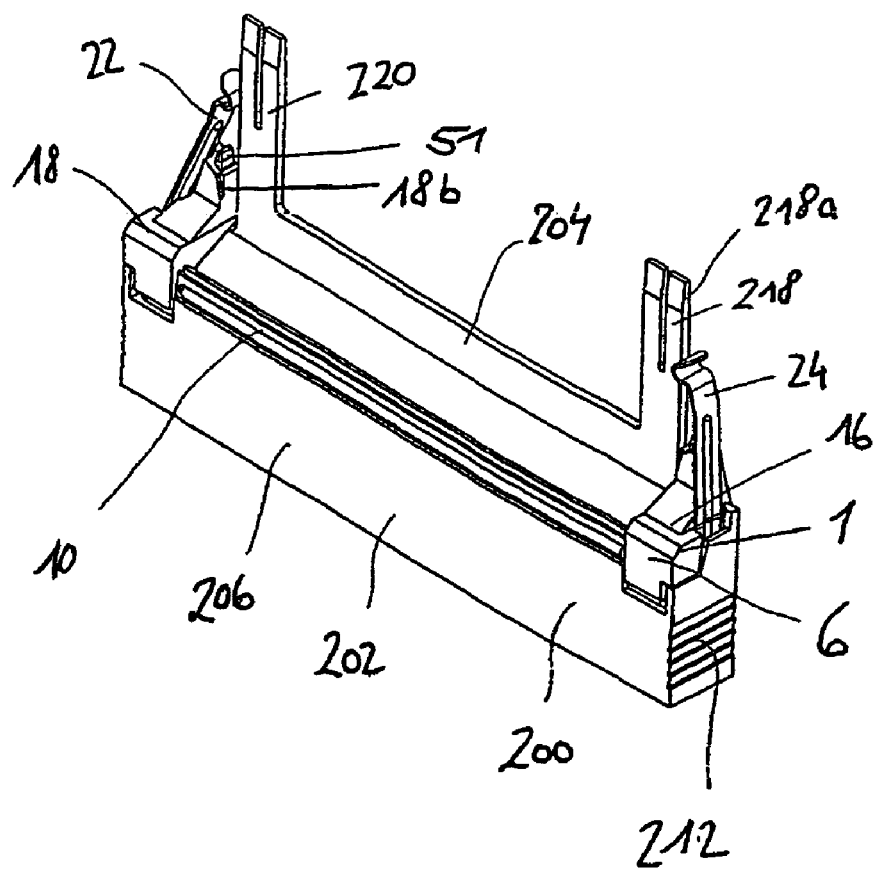

In order to pass on an overvoltage current such as this to the grounding rail 10 of the associated grounding apparatus 6 and in order at the same time to fit the safety plug 8 to this grounding rail 10, this embodiment of the safety plug 8 has a fitting which acts as a holding apparatus and is shown enlarged in FIGS. 11 and 12. The fitting 26 is formed from a conductive material, in particular of metal, and on its lower face has an insulation-displacement terminal 100, by means of which the fitting is clamped to the third electrode 90, which for this purpose has an attachment 92 in the form of a rod. On its side facing away from the overvoltage/overcurrent protection device 84 and facing away from the contact tongue 28, the fitting 26 is provided with an attachment part 94, which in this case is in the form of a bracket with two limbs. The bracket limbs 100a, 100b of the attachment part 94 can be bent in the direction at right angles to the longitudinal extent of the contact tongue 28, so that the grounding rail 10 can be clamped in between them in order to secure the safety plug 8. The two clamping limbs 100a, 100b of the insulation-displacement terminal 100 can be spread apart from one another, parallel to the surface of the contact tongue 28.

In this case, the fitting 26 is produced from a metal sheet in the form of plate, with the insulation-displacement terminal 100 being partially stamped out of the associated plate surface and being bent downwards, with the upper clamping limb 94a of the attachment part 94 being formed from a plate section which is bent through 1800 upwards and to the rear, and with the lower clamping limb 94*b* of the attachment part 94 being formed from the remaining plate section.

Figure 7:
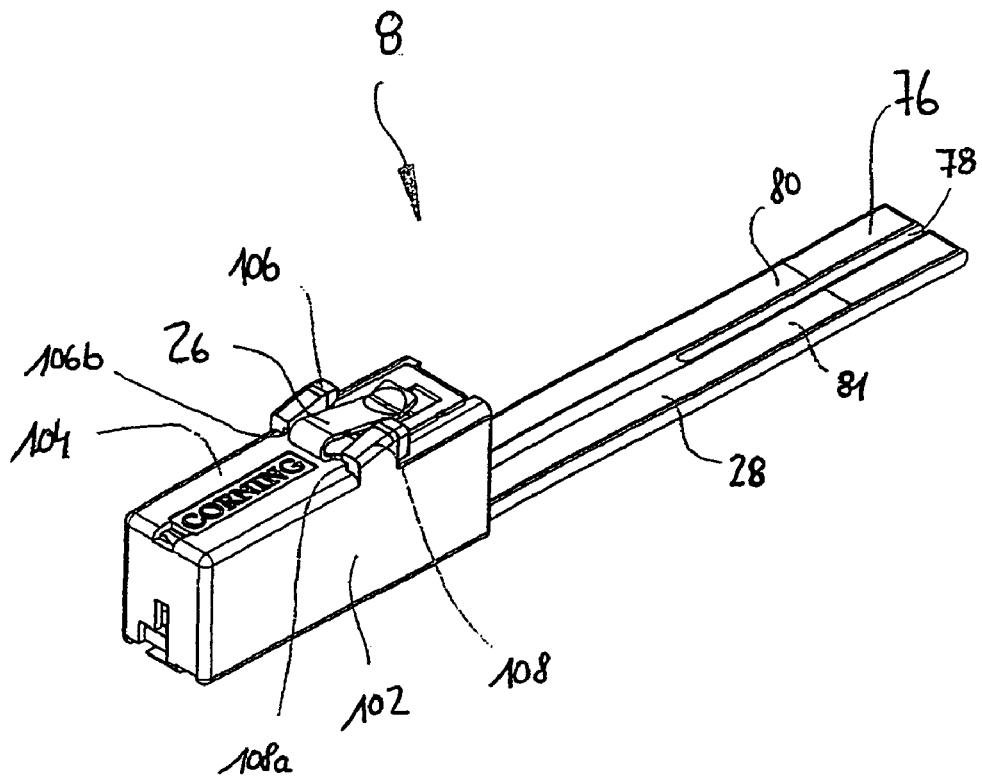
FIG. 7 shows a safety plug according to one embodiment of the invention, illustrated in perspective from the side and from below.

As can be seen from FIG. 7, a cover 102 in the form of a housing can be pushed over the overvoltage/overcurrent protection device 84 and the associated end section of the contact tongue 28, and this cover 102 has a cutout on its upper face, in which the fitting 26 together with its insulation-displacement terminal 100 can be held. The cover 102 is completely open at the front, so that the contact tongue 28 with its overvoltage/overcurrent protection device 84 and the fitting 26 fitted to it can be inserted into the cover 102 from this side.

The cover 102 is provided on its side facing the fitting 26, that is to say in this case on its lower boundary wall 104, with two holding arms 106, 108, which are arranged at a distance from one another in the direction transversely with respect to the direction in which the housing is plugged on (in this case the longitudinal direction of the contact tongue 28), and in which a longitudinal groove 106*a*, 108*a*, which runs in the stated direction in which the cover is plugged on, is formed on the mutually facing inner faces, and adjacent to the lower boundary wall 104. The holding part 26 engages at the edges in these longitudinal grooves 106*a*, 108*a* thus securing it from becoming detached upwards and downwards.

FIGS. 13 to 16 show a handling apparatus 200 for mounting a grounding apparatus 6 according to the invention on an associated functional element 20 according to one embodiment of the invention, with the grounding apparatus 6 inserted.

Figure 17:
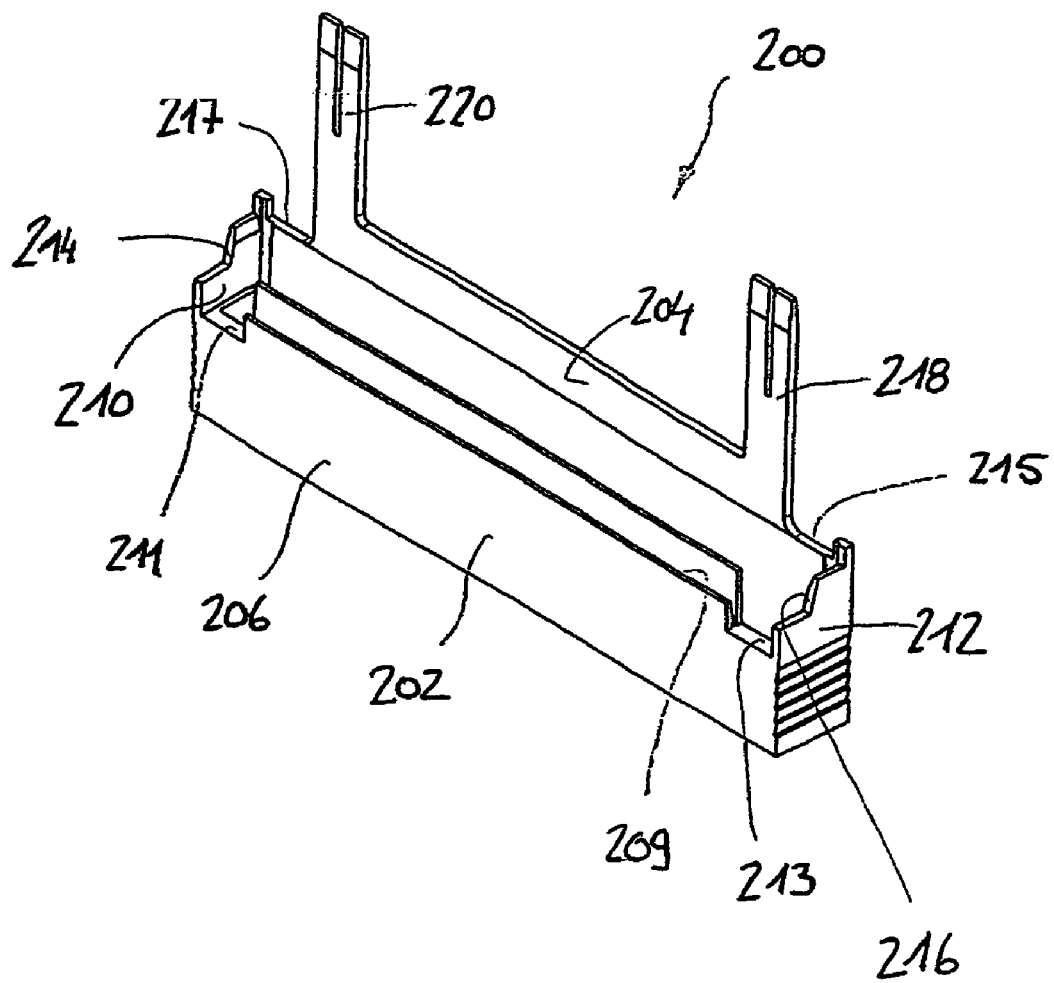
FIG. 17 shows the handling apparatus as shown in FIGS. 13 to 16, illustrated in perspective, without a grounding apparatus inserted.
Figure 22:
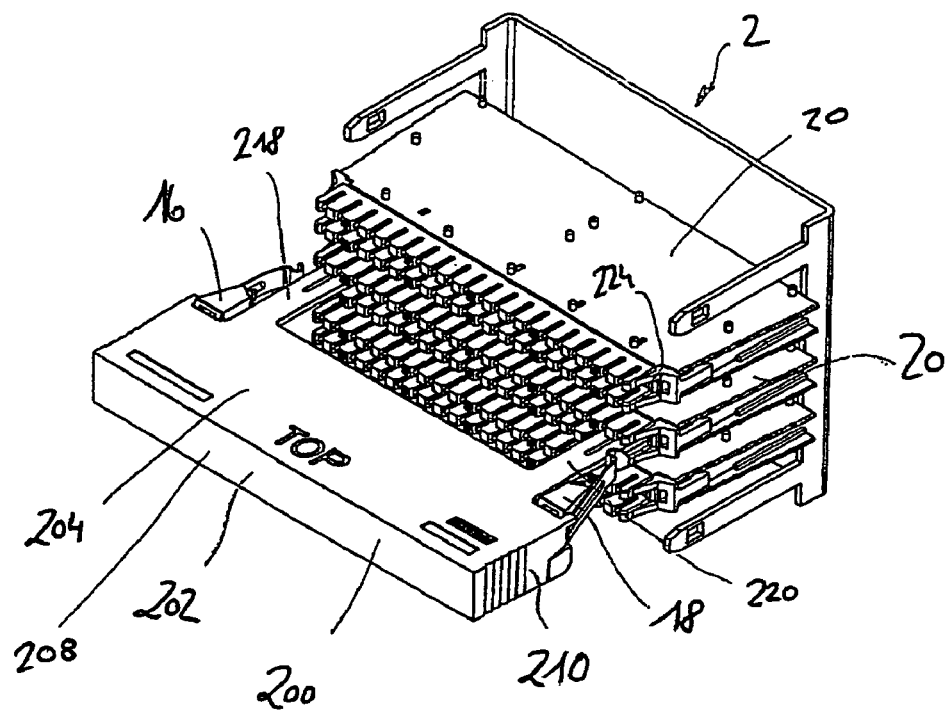
FIG. 22 shows an exploded illustration, showing the fitting of a grounding apparatus to a distribution device by means of a handling apparatus, in a perspective view from the side and from above.
Figure 23:
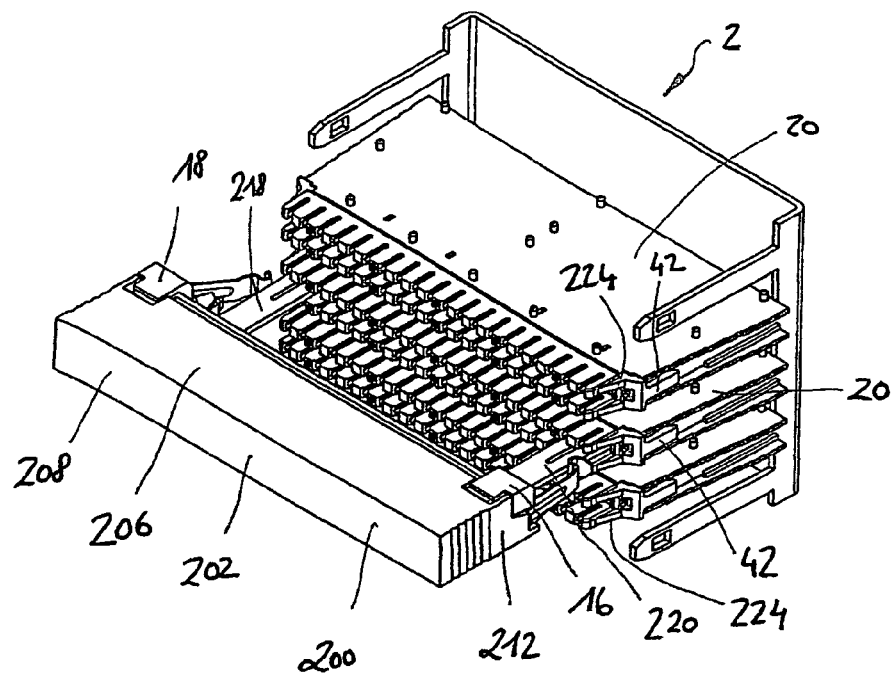
FIG. 23 shows an illustration, corresponding to the illustration shown in FIG. 22, from a viewing direction from the side and from below.

FIG. 17 shows the handling apparatus 200 without the grounding apparatus inserted in it. FIGS. 18 to 21 show the handling apparatus 200 and the grounding apparatus 6 in a state in which the grounding rail 10 of the grounding apparatus 6 is just inserted into the handling apparatus 200. FIGS. 22 and 23 show how a grounding apparatus 6 is fitted to the distribution device 2 by means of the handling apparatus 2 according to the invention.

According to this, the handling apparatus 200 has an elongated base body 202 which is in the form of a box and has an upper boundary wall 204, a lower boundary wall 206 as well as a boundary wall 208 on the longitudinal side and two end-face boundary walls 210, 212. The base body 202 which is in the form of a box is open on the longitudinal side opposite the boundary wall 208 on the longitudinal side (see, for example, FIG. 17).

As can be seen in particular from FIG. 17, the base body 202 which is in the form of a box has a retaining groove 209 which runs in its longitudinal direction and is formed from the lower boundary wall 206, on its end face facing the open side of the base body 202. The retaining groove 209 is in this case open in the same direction as the base body 202.

The length of the grounding rail 10 is slightly shorter from the length of the base body 202 (which is in the form of a box) of the handling apparatus 200, so that the grounding rail 10 is bounded at its two longitudinal ends by the end walls 210, 212 of the base body 202, which is in the form of a box, with little play, when the grounding rail 10 of the grounding apparatus 6 is inserted into the retaining groove 209 of the handling apparatus 200. The end walls 210, 212 of the base body 200, which is in the form of a box, thus represent side stops for the grounding apparatus 6 once it has been inserted into the handling apparatus 200.

Figure 18:
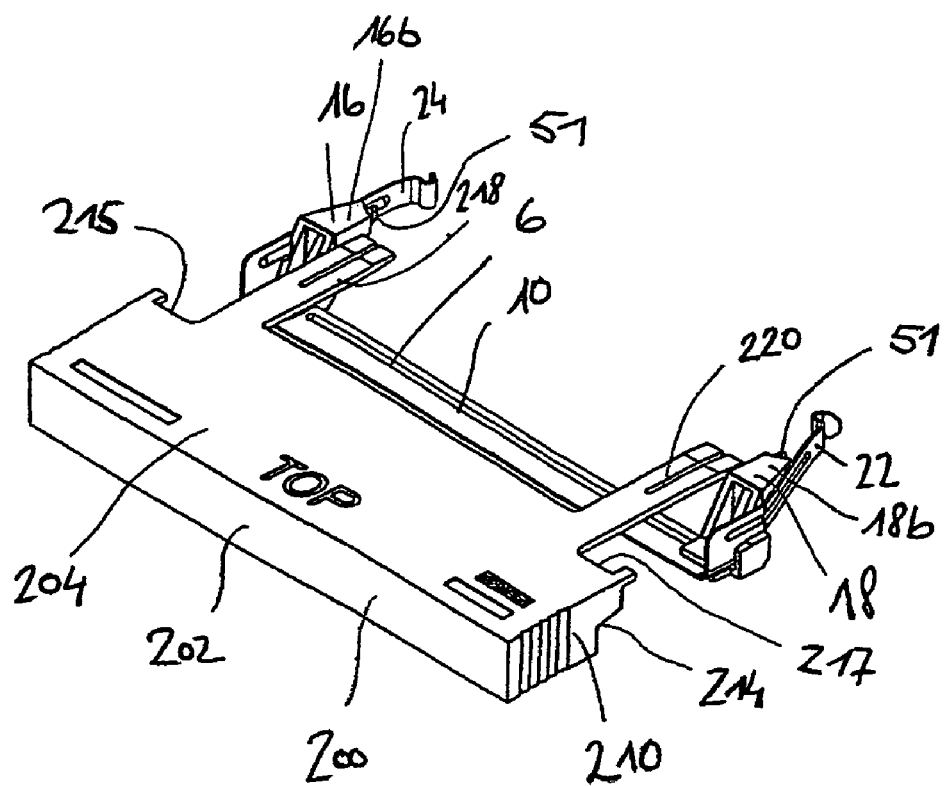
FIGS. 18 to 21 show exploded illustrations, which are used to show, in perspective form, the insertion of a grounding apparatus according to the invention into a handling apparatus according to the invention, from different viewing directions.
Figure 19:
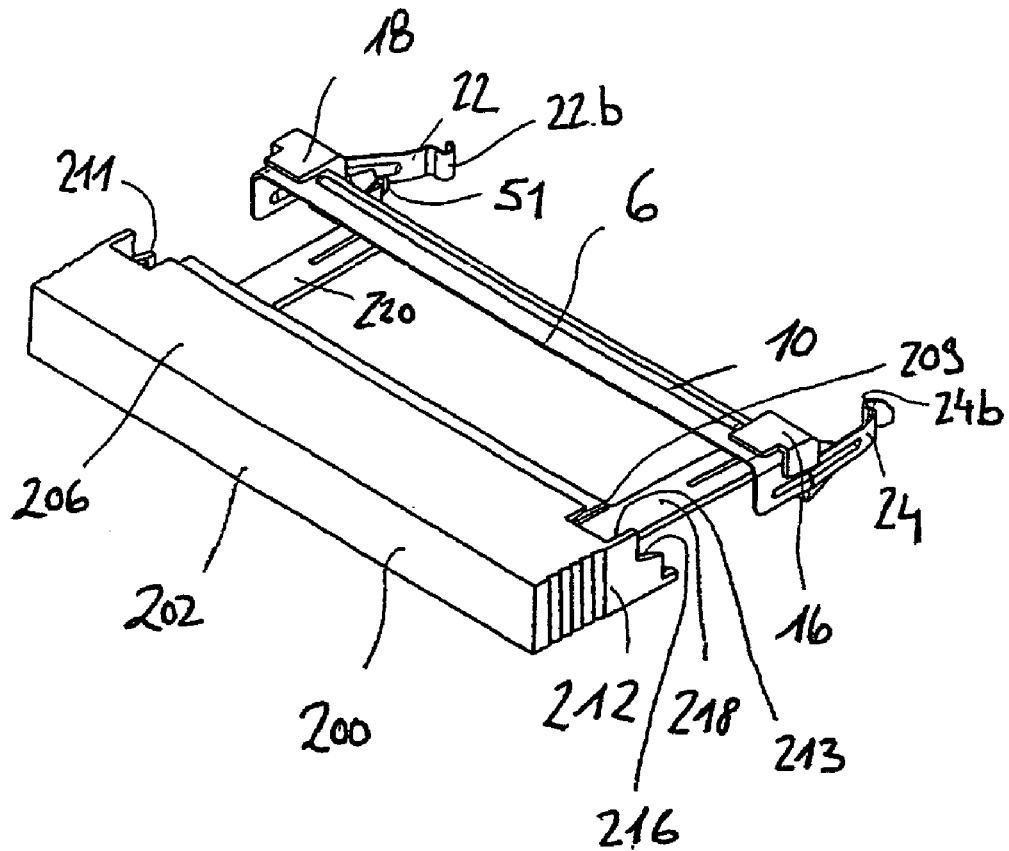
Figure 20:
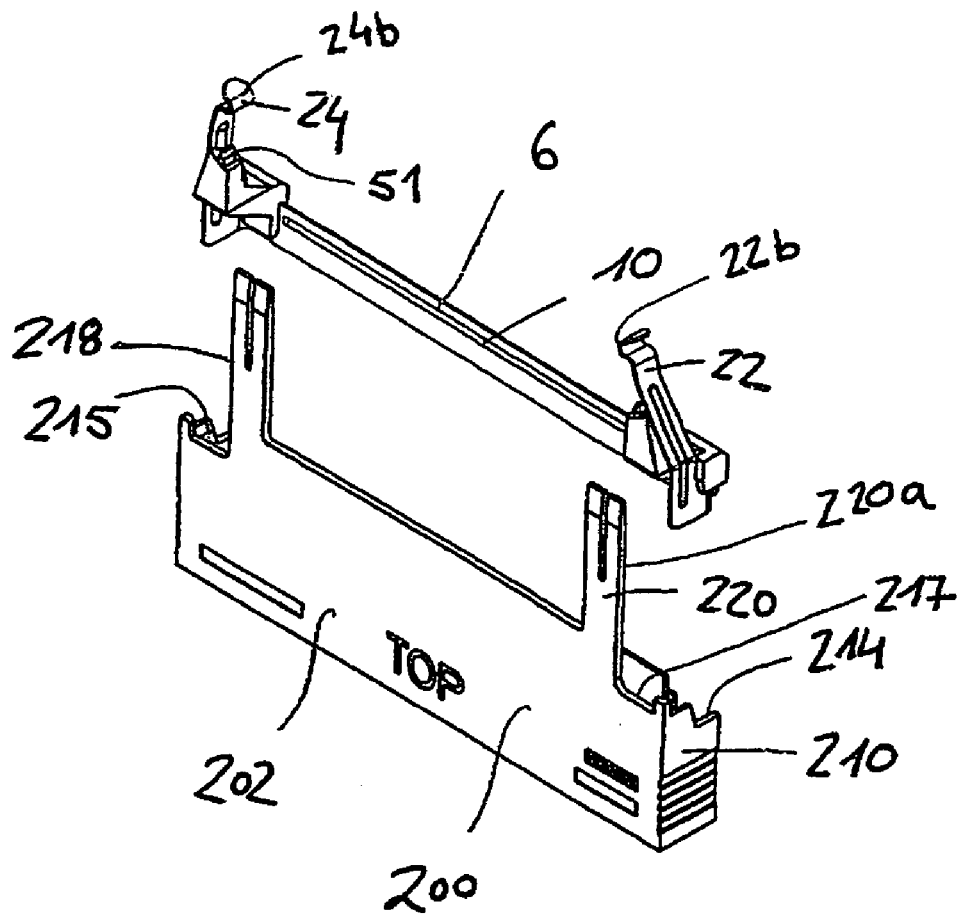
Figure 21:
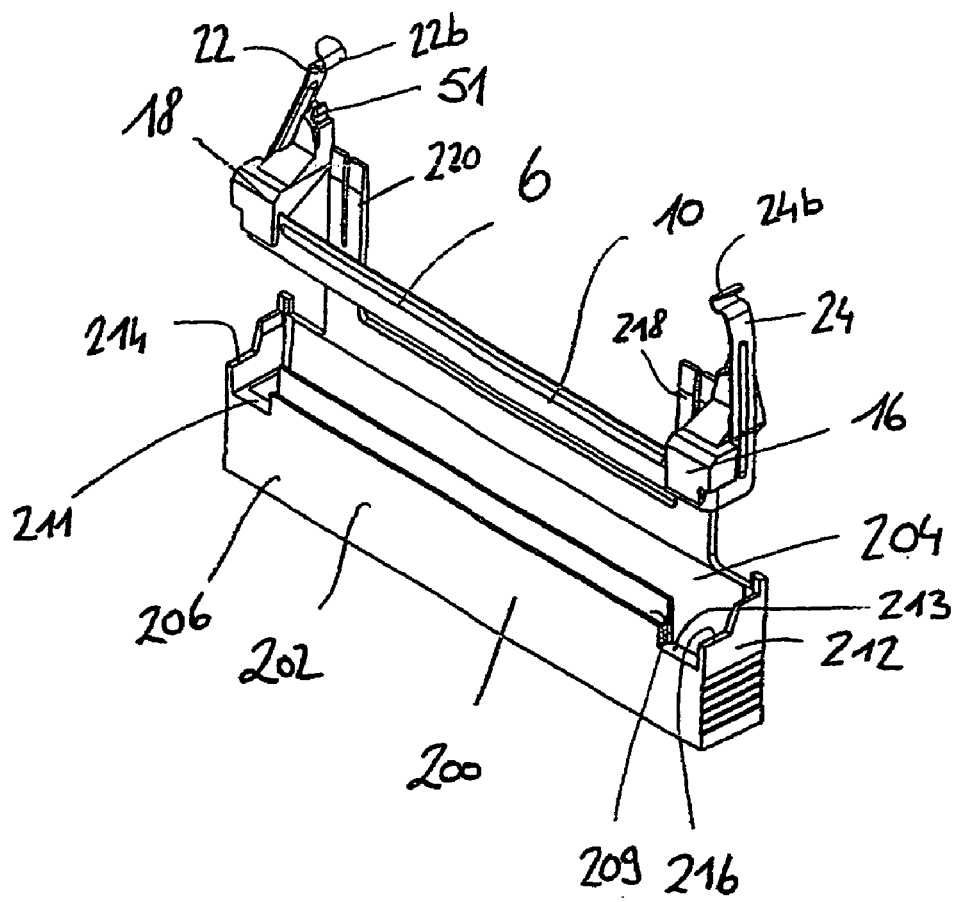

Since the holding parts 16, 18, which extend somewhat beyond the grounding rail 10, would now collide with the side end walls 210, 212 of the handling apparatus 200, corresponding cutouts 214, 216 are formed in the side end walls 210, 212, in each of which cutouts 214, 216 a respective section of the holding parts 16, 18 can be held, as can be seen, for example, from FIGS. 17 to 19. The same applies to the lower boundary wall 204 and to the upper boundary wall 206 of the base body, in which respective boundary wall cutouts 211, 213; 215, 217 are likewise formed in order to hold sections of the holding parts 16, 18.

The handling apparatus 200 also has two elongated guide tongues 218, 220, each of which is arranged on a longitudinal end section, associated with it, of the handling apparatus 200, and which extend forwards parallel to the opening direction of the retaining groove 209 and to the open side of the base body 202 which is in the form of a box, and thus also at right angles to the longitudinal direction of the handling apparatus 200 and of the grounding apparatus 6 which has been inserted into it. The two guide tongues 218, 220 are formed from the upper boundary wall 204 of the base body 202; the lateral distance between the respective guide tongue 218, 220 and the associated side end wall 210, 212 of the base body is chosen to be sufficiently large to be able to hold the holding parts 16, 18 and the associated contact springs 22, 24 between them (see, for example, FIGS. 13 to 15).

The two guide tongues 218, 220 have a respective linear guide surface 218*a*, 220*a* on their outer side surface; the two guide surfaces 218*a*, 220*a* thus face away from one another. The longitudinal distance between these two guide surfaces 218*a*, 218*b* is slightly less than the longitudinal distance between the end-face boundary walls of a guide element 20, so that the handling apparatus 200 can be pushed into the functional element 20, guided by its two guide tongues 218, 220 as may be seen from FIGS. 21 and 22. In this case, the side guide surfaces 218*a*, 218*b* of the two guide tongues 218, 220 slide along an associated end-face boundary wall of the functional element 20 outside, at the sides.

The grounding apparatus 6 is positioned, as defined by the retaining groove 209 with respect to the handling apparatus 200 and its guide tongues 218, 220, such that both the holding parts 16, 18 together with their attachment pieces 51 as well as the contact springs 22, 24 together with their engagement parts 22*b*, 24*b*, are guided with precision on the functional element 20 with respect to the corresponding mating pieces. This considerably simplifies the assembly process, thus also reducing the risk of damage when tilting and incorrect fitting of grounding apparatuses 6.

The system comprising the handling apparatus 200 and the grounding apparatus 6 is adapted such that the contact springs 22, 24 extend forwards parallel to the guide tongues 218, 220 and adjacent to them when the grounding apparatus 6 is being inserted into the handling apparatus 200.

In order that the contact springs 220, 218 spring relatively easily outwards while the grounding apparatus 6 is being pushed onto the functional element 20, ramps 224 are provided on the respective functional element 20, as can be seen in FIGS. 22 and 23, and rise outwards in the direction in which the grounding apparatus 6 is inserted (see FIGS. 22 and 23). While the grounding apparatus 6 is being pushed on, the contact springs 22, 24 slide over these ramps 224, springing apart to the side, and then slide over the locking arm 42 which is provided on the respective functional element 20, without there being any risk of blocking the overall pushing-on movement.

The handling apparatus 200 is preferably provided in the form of a plastic injection-molded part.

Since the grounding apparatus 6 is inserted only loosely from the front into the handling apparatus 200, in particular with the grounding rail 10 being held only loosely in the retaining groove 209, although the handling apparatus 200 can exert forces on the grounding apparatus 6 in the direction in which it is being plugged on, the handling apparatus 200 can, however, easily be removed from the grounding apparatus 6, which is then fitted firmly to the functional element 20, that is to say in this case being plugged in and clamped on, once the mounting of the grounding apparatus 6 on the functional element 20 has been completed.

The invention claimed is:

1. A grounding apparatus for a distribution device having a functional element and a grounding contact point, wherein the distribution device includes at least one functional element defining a front face comprising a plurality of connecting points extending outwardly from the functional element, the grounding apparatus comprising:
    an elongated, electrically conductive grounding rail having opposed end sections, each end section provided with a holding part for fitting the grounding rail to the functional element of the distribution device, wherein the holding part positions the grounding rail substantially outward of the connecting points of the functional element when the grounding rail is fitted to the functional element; and
    an electrically conductive contact spring provided on each of the end sections of the grounding rail, the contact spring extending outwardly beyond the holding part to make contact with the grounding contact point on the distribution device.

2. The grounding apparatus as claimed in claim 1, wherein the holding parts are composed of nonconductive, plastic material.

3. The grounding apparatus as claimed in claim 1
    wherein the holding parts each have a holding piece that extends essentially perpendicular to the longitudinal extent of the grounding rail; and
    wherein the contact springs extend outwardly from the grounding rail essentially parallel to the holding pieces.

4. The grounding apparatus as claimed in claim 3, wherein the grounding rail is arranged offset with respect to the holding pieces in a direction essentially perpendicular to the longitudinal extent of the grounding rail.

5. The grounding apparatus as claimed in claim 1, wherein each contact spring extends outwardly beyond the respective holding part relative to the longitudinal extent of the grounding rail and is adapted to be spread apart resiliently to make contact with the respective grounding contact point of the distribution device.

6. The grounding apparatus as claimed in claim 1 further comprising at least one safety plug connected to the grounding rail.

7. A safety plug for use with a grounding apparatus of a distribution device having a functional element, wherein the functional element defines a front face comprising a plurality of connecting points extending outwardly from the functional element and wherein the grounding apparatus is positioned substantially outward of the connecting points of the functional element, the safety plug comprising:
    a contact tongue for making contact with an electrical cable connected to the functional element of the distribution device;
    an overvoltage protection device connected to the contact tongue, the overvoltage protection device having a grounding electrode with an attachment in the form of a rod through which an overvoltage current is dissipated; and
    an electrically conductive fitting in electrical contact with the grounding electrode of the overvoltage protection device for connecting the safety plug to the grounding apparatus, the fitting comprising
        an insulation-displacement terminal for clamping the fining to the attachment provided on the grounding electrode; and
        an attachment part for attaching the fitting to the grounding apparatus substantially outward of the connecting points of the functional element.

8. The safety plug as claimed in claim 7, wherein the fitting is a clamping part adapted to be clamped to the grounding apparatus.

9. A distribution device comprising:
    an elongated retaining apparatus;
    at least one functional element held in the retaining apparatus, each functional element having longitudinal end sections and an elongated contact section with connecting points for connecting incoming and outgoing electrical cables wherein the functional element defines a front face comprising a plurality of connecting points extending outwardly from the functional element;
    at least one grounding apparatus associated with the at least one functional element, the grounding apparatus having a grounding rail arranged substantially outward of the connecting points of the functional element and parallel to the elongated contact section of the associated functional element and the grounding apparatus having holding parts on opposed ends of the grounding rail for receiving the longitudinal end sections of the functional element; and
    at least one safety plug associated with the at least one grounding apparatus, the safety plug having a contact tongue extending in the direction of the functional element for connecting the safety plug to the grounding rail to make contact with the electrical cables.

10. The distribution device as claimed in claim 9, wherein the grounding rail of each grounding apparatus is arranged offset with respect to the associated functional element in the longitudinal direction of the retaining apparatus.

11. The distribution device as claimed in claim 9
    wherein the connecting points are arranged along the elongated contact section of the respective functional element and are subdivided into a row of first connecting points for the incoming electrical cables and a row of second connecting points for the outgoing electrical cables; and
    wherein the grounding rail of the associated grounding apparatus is arranged adjacent to the row of second connecting points.

12. The distribution device as claimed in claim 9
    wherein the retaining apparatus is in the form of an elongated, electrically conductive retaining trough with a trough base and two trough limbs in which elongated, retaining tongues are formed and between which the respective functional element is inserted; and
    wherein the grounding apparatus comprises contact springs that make contact to the associated functional element in a sprung manner with the retaining tongues to produce an electrical contact.

13. The distribution device as claimed in claim 12, wherein the contact springs on the grounding rail of the grounding apparatus are provided with an engagement part for engaging a corresponding mating piece provided on the associated functional element to fix the grounding apparatus on the functional element.

14. A handling apparatus for installing a grounding apparatus of a distribution device having a functional element, wherein the distribution device includes at least one functional element defining a front face comprising a plurality of connect of points extending outwardly from the functional element the handling apparatus comprising:
- an elongated base body in the form of a box and having a retaining groove extending in a longitudinal direction, the base body open on one side for receiving a grounding rail of the grounding apparatus within the retaining groove and having a side stop that centers the grounding apparatus with the grounding rail inserted into the retaining groove relative to the handling apparatus;
- wherein the grounding rail is adapted to be positioned substantially outward of the connecting points of the functional element when the handling apparatus is installed on the distribution device.

15. The handling apparatus as claimed in claim 14, wherein the base body has at least one guide tongue that extends transversely with respect to the longitudinal direction of the retaining groove and a side surface for sliding along a corresponding guide surface on the functional element.

16. The handling apparatus as claimed in claim 15, further comprising a pair of guide tongues that are arranged at a predetermined distance from one another with respect to the longitudinal direction of the retaining groove.

17. The handling apparatus as claimed in claim 15
- wherein the base body has an upper boundary wall, a lower boundary wall, two end walls and a boundary wall that extends in the longitudinal direction of the retaining groove such that the base body is open on one side; and
- wherein to retaining groove is essentially open in the same direction as the open side of the base body.

18. The handling apparatus as claimed in claim 17, wherein side stops are formed by the two end walls of the base body.

19. The handling apparatus as claimed in claim 17 wherein each guide tongue is formed from the upper boundary wall of the base body and wherein the retaining groove is formed in the lower boundary wall of the base body.

* * * * *